Jan. 25, 1927.

V. BREUER ET AL 1,615,565

AUTOMOBILE BUMPER

Filed Dec. 15, 1924    4 Sheets-Sheet 1

INVENTORS
V. Breuer & P. Leschnik
BY
Sigmund Herzog
ATTORNEY

Jan. 25, 1927.　　　V. BREUER ET AL　　　1,615,565
AUTOMOBILE BUMPER
Filed Dec. 15, 1924　　　4 Sheets-Sheet 2

INVENTORS
V. Breuer + P. Leschnick
BY
Sigmund Herzog
ATTORNEY

Jan. 25, 1927.
V. BREUER ET AL
1,615,565
AUTOMOBILE BUMPER
Filed Dec. 15, 1924  4 Sheets-Sheet 3
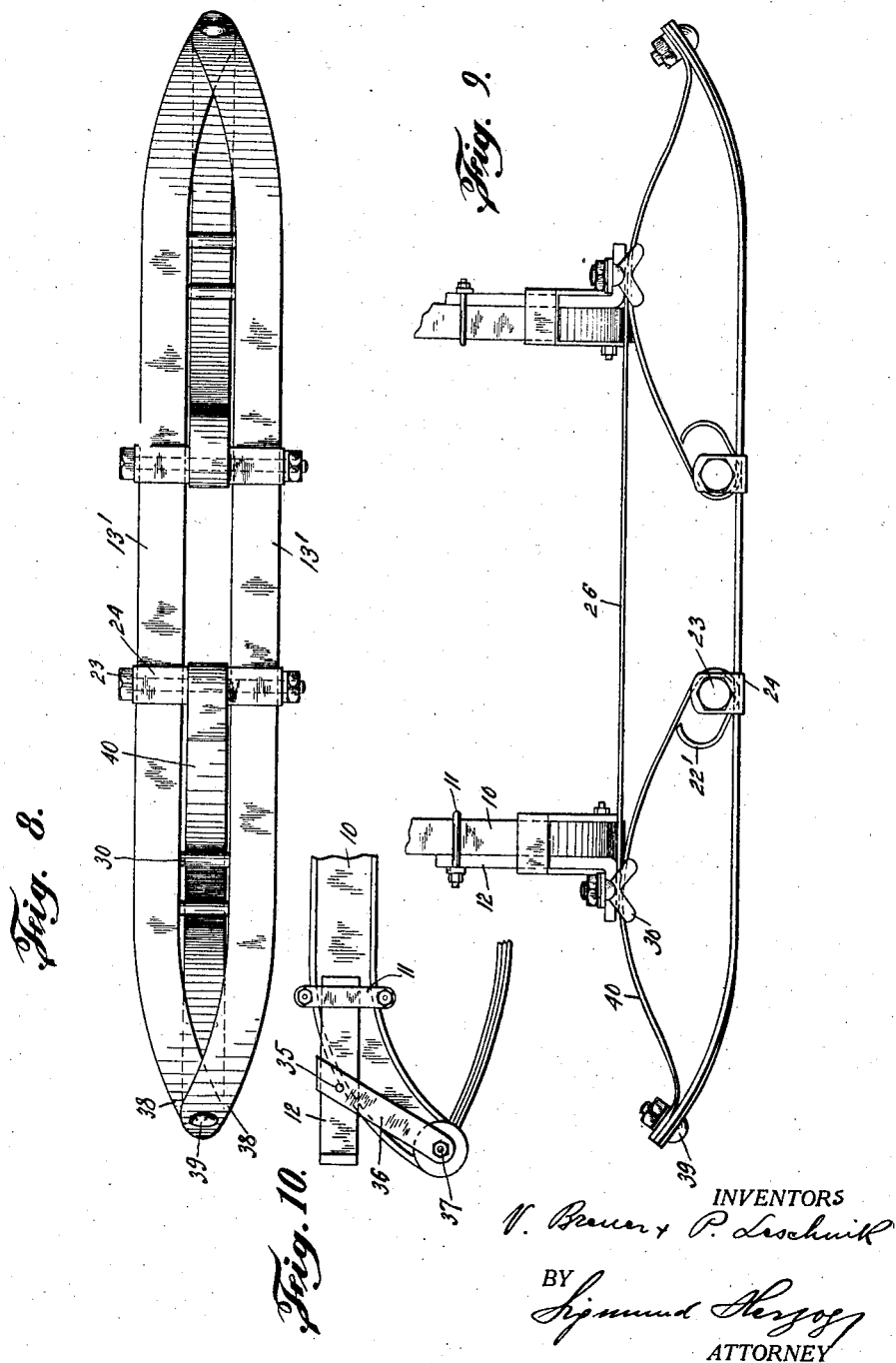

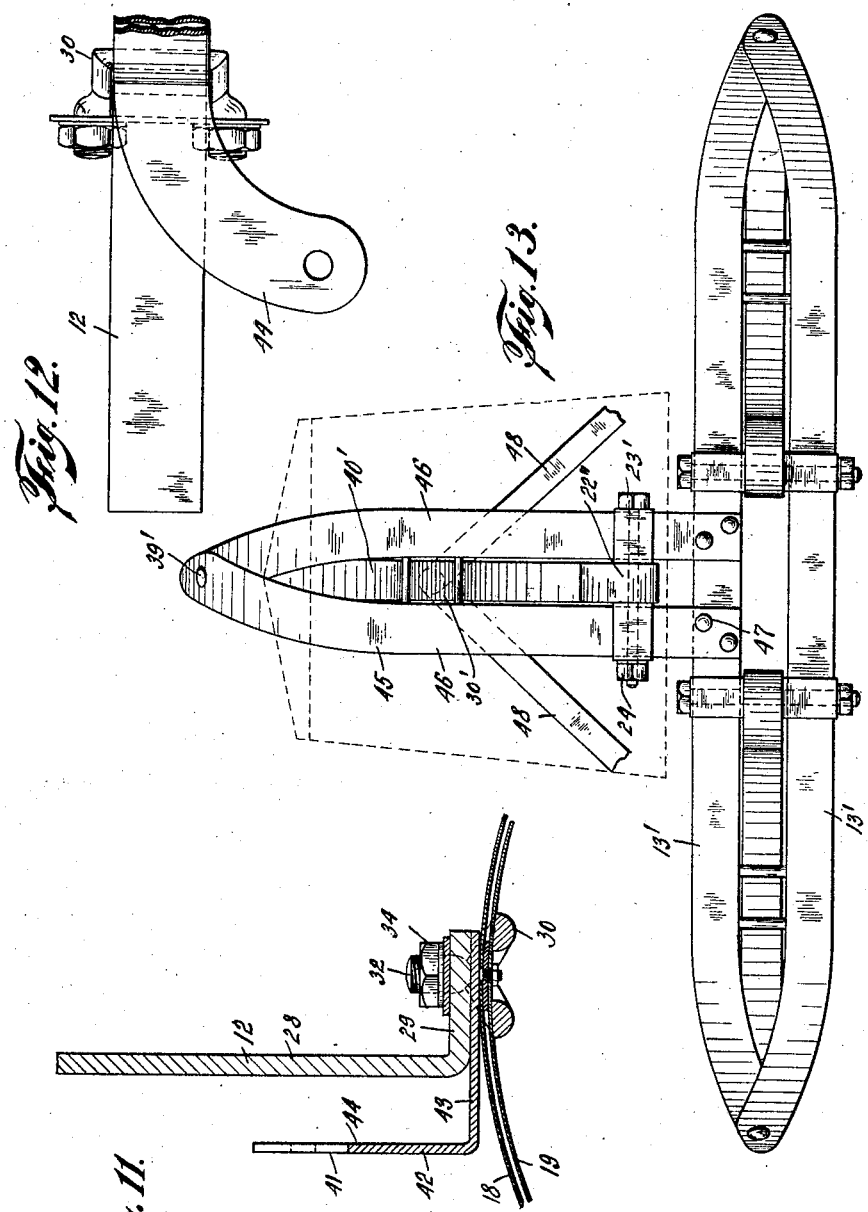

Patented Jan. 25, 1927.

1,615,565

UNITED STATES PATENT OFFICE.

VLADIMIR BREUER AND PHILIP LESCHNIK, OF NEW YORK, N. Y.

AUTOMOBILE BUMPER.

Application filed December 15, 1924. Serial No. 755,948.

The present invention relates to improvements in automobile bumpers and attaching devices therefor.

One of the objects of the invention is to provide a device of this type which allows movement between the bumper parts, thereby making the structure more flexible and better capable of withstanding the shocks of impact without being permanently distorted.

Another object of the invention is to produce a bumper of the character mentioned which is simple in construction, efficient in operation, durable in use, and which may be readily mounted on the vehicle.

A further object of the invention is to provide a bumper of this type which is capable of manufacture on a commercial scale, or in other words one which is not so difficult to make as to be beyond the reasonable cost of such a contrivance.

A still further object of the invention is to provide a simple connecting means between the bumper and the supporting brackets thereof.

A still further object of the invention is to provide an attachment for the supporting brackets of the bumper, by means of which a more rigid connection is obtained for the supporting brackets.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

A few of the many possible embodiments of the invention are illustrated in the accompanying drawings, in which:—

Figure 1:
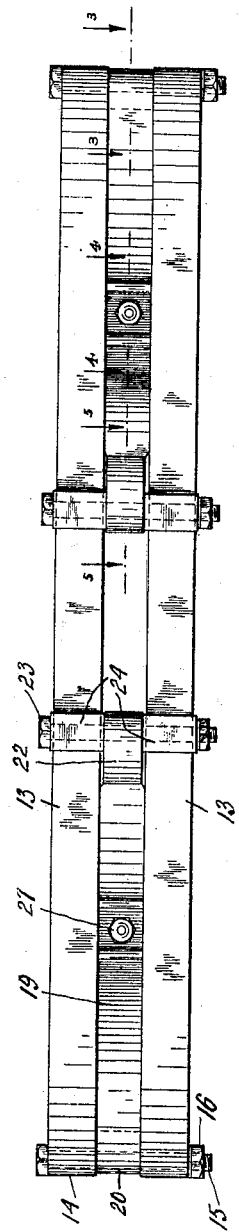
Figure 2:
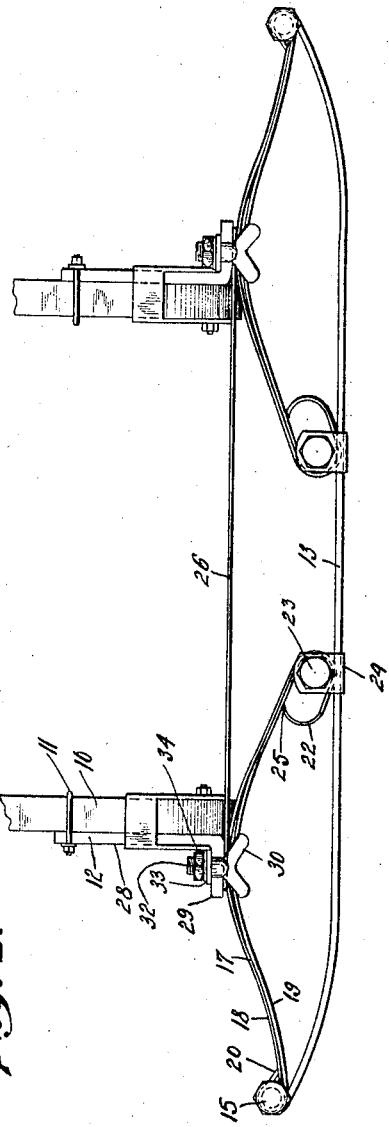
Figure 5:
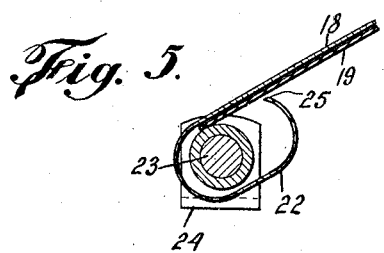
Figure 3:
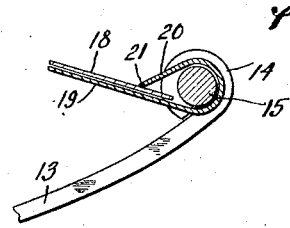
Figures 4, 14:
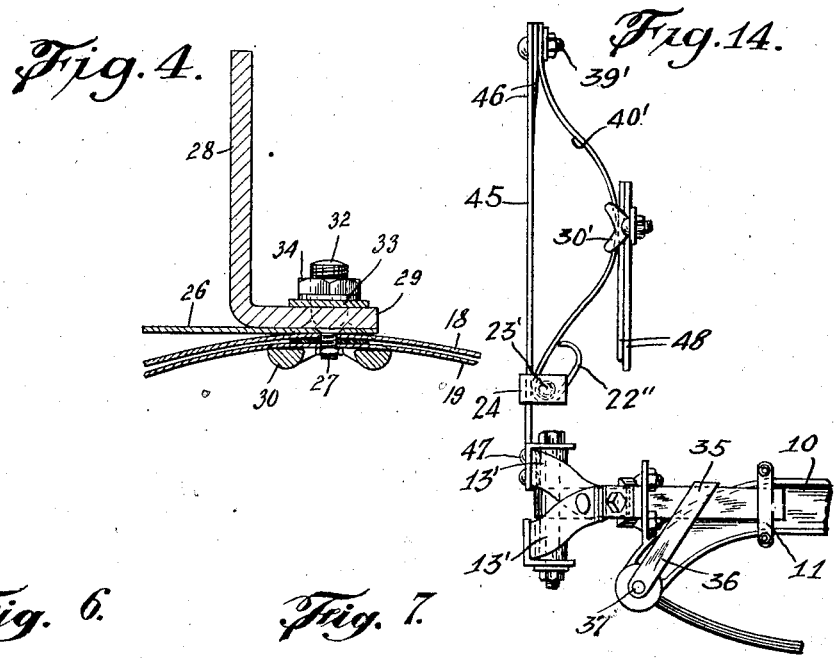
Figure 6:
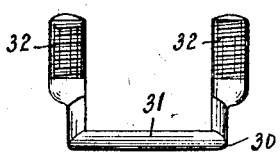
Figure 7:
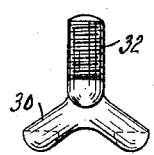

Figure 1 is a front elevation of a bumper constructed in accordance with the present invention; Fig. 2 is a top plan view thereof; Fig. 3 is a section taken on line 3—3 of Fig. 1, on a larger scale; Fig. 4 is a section taken on line 4—4 of Fig. 1, on a larger scale; Fig. 5 is a section taken on line 5—5 of Fig. 1, also on a larger scale; Fig. 6 is a side elevation of the connecting means between the bumper and the supporting brackets thereof; Fig. 7 is a top plan view of the device shown in Fig. 6; Fig. 8 is a front elevation of a modified bumper; Fig. 9 is a top plan view of the bumper shown in Fig. 8; Fig. 10 is a side elevation of the supporting bracket attachment of both constructions shown herein; Fig. 11 is a top plan view of a modified supporting bracket attachment; Fig. 12 is a side elevation of the device shown in Fig. 11; Fig. 13 is a front elevation of a modified bumper; and Fig. 14 is a side elevation of the device illustrated in Fig. 13.

Referring now first to Figs. 1 to 7, inclusive, of the drawings, the numerals 10 indicate the front end portions of the longitudinal frame members of a motor vehicle, to which are attached in any suitable manner, for instance by clamping devices 11, forwardly projecting substantially horizontal brackets 12, supporting the bumper.

The bumper comprises an impact member that is inherently flexible, it being constructed of two parallel bars 13, spaced apart vertically. The space between the two bars is substantially equal to the width of each of the bars. The ends of the bars, which project beyond the sides of the automobile frame, are curved and formed into tubular terminals 14. The terminals of one bar register with those of the other. Through the registering terminals extend headed screwbolts 15, the threads of which mesh with those of nuts 16. With each bolt 15 is engaged a laminated spring 17. These springs are disposed in rear of the bars 13. In the case shown in the drawings, each spring is substantially semi-elliptic and comprises two leaves 18 and 19. On the outer end of each leaf 19 is formed an eye 20, which extends around the respective bolt 15. The outer end of each leaf 18 extends into the respective eye, it being held in position by the free end 21 of said eye. The inner end of each leaf 18 is shaped to form an elongated eye 22, through which is extended a headed screw-bolt 23, carried by clips 24, the latter being fixed to the bars 13. The inner end of each spring 19 is extended into the respective eye 22 (Fig. 5), it being held in position by the free end 25 of the eye portion 22 of the respective leaf 18. The lengths of the eyes 22 are sufficient to permit the bolts 23 to slide longitudinally of the laminated springs with ample freedom.

The two laminated springs are connected by means of a reinforcing bar 26, the ends of which are connected to the central portions of the laminated springs in any suitable manner, for instance by screws 27.

Each of the supporting brackets 12 is substantially L-shaped, the longer leg thereof, denoted by the numeral 28, abutting against the respective frame member 10, while the shorter leg, denoted by the numeral 29, bears against the reinforcing bar 26. The connection between a supporting bracket and the respective laminated spring is made by a clamping member 30, comprising two substantially U-shaped sections 31, which straddle the respective laminated spring, the said U-shaped sections converging to and being made integral with two screw-bolts 32, the latter extending through a strip 33, that abuts against the rear face of the leg 29 of the L-shaped supporting bracket. With the threads of the bolts 32 mesh nuts 34. These nuts clamp against the strip 33, holding the entire device in place.

In order to more securely hold the bumper in position, there is attached, for instance by a rivet 35 (Fig. 10), to each supporting bracket 12 a substantially U-shaped auxiliary bracket 36, which straddles the respective end portion 10 of the longitudinal frame member of the motor vehicle and is adapted to be connected to a spring bolt 37 of the automobile frame.

The bumper is, preferably, made of spring-steel throughout and yields thus readily to forces exerted upon it in any direction. In case the bumper strikes an object it yields freely thereto, a combination spring action being obtained which, while rendering the bumper resilient in operation, imparts to it great strength, the laminated springs 17 reinforcing the spring impact members 13, and the connecting bar 26 preventing a deformation of the impact members. An added degree of flexibility is obtained in the structure by reason of the slot and bolt connection between the impact bars 13 and the laminated springs 17.

The modification illustrated in Figs. 8 and 9 of the drawings differs from the one above described mainly in that the impact bars 13' do not extend in parallel relation throughout their lengths, but converge at their ends 38, where they are united by screw bolts 39. The bolts 39 serve at the same time to fixedly attach to the bars 13' semi-elliptic springs 40, the inner ends of which are provided with eyes 22', in the same manner as the semi-elliptic springs shown in Figs. 1 and 2 of the drawings. Otherwise the construction and operation of the elements are the same as of those described in connection with Figs. 1 to 7, inclusive, of the drawings.

The modification illustrated in Figs. 11 and 12 of the drawings differs from those above described in that the auxiliary brackets are held adjustably upon the supporting brackets 12. The auxiliary brackets are in this instance denoted by the numerals 41, and comprise each a substantially L-shaped member 42, the leg 43 of which extends in parallel relation to the shorter leg 29 of the respective bracket 12, it abutting against the said leg 29 and being held in position by the respective clamping member 30. The other leg of the L-shaped auxiliary bracket is denoted by the numeral 44, it extending downwards and being connected to a spring bolt 37 of the automobile frame. It will be readily understood that the distance between the leg 44 of an auxiliary bracket and the longer leg 28 of a supporting bracket 12 may be adjusted according to the requirements, by simply unscrewing the nuts 34 co-operating with the respective clamping member 30.

The modification illustrated in Fig. 13 of the drawings differs from those above described in that the impact member has centrally attached thereto an upwardly extending vertical impact member, denoted by the numeral 45. The last-mentioned impact member comprises two spaced vertical parallel spring bars 46, which are attached at their lower ends, at 47, to the upper one of the impact bars 13'. The free ends of the bars 46 are curved and connected by a screw bolt 39', which serves at the same time to fasten to the said bars a semi-elliptic spring 40', the lower end of which is provided with an elongated eye 22'', through which extends a bolt 23', that is carried by clips 24, the latter being fixed to the bars 13'. By means of a clamping member 30', which is alike in construction to the clamping member 30 above described, there are attached to the central portion of the semi-elliptic spring 40' two braces 48, the lower ends of which are secured in any suitable manner to the longitudinal frame members of the automobile. The vertically extending impact member is disposed in front of the radiator of the automobile, and its purpose is to protect the said radiator against impact in case of a collision.

What we claim is:—

1. An automobile bumper comprising two supporting brackets adapted to be attached to the end portion of a vehicle frame, two semi-elliptic laminated springs secured adjacent their middle portions to said brackets, said springs extending forwardly and their outer ends projecting sidewardly beyond the vehicle frame, the inner ends of said springs being bent to form elongated eyes, the outer ends of the springs being also bent into the form of eyes, a bolt extending through the eye on the outer end of each spring, each bolt projecting above and below the respective spring, two impact bars disposed in front of said laminated springs, one above said laminated spring and the other one below the same, said impact bars connecting said bolts, two spaced bolts fixed to said impact bars, said last-mentioned bolts extending through the elongated eyes on the inner ends of said springs.

2. An automobile bumper comprising two supporting brackets adapted to be attached to the end portion of a vehicle frame, two semi-elliptic springs secured adjacent their middle portions to said brackets, said springs extending forwardly and their outer ends projecting sidewardly beyond the vehicle frame, a horizontally extending impact member attached to the outer ends of said springs, two spaced bolts fixed to said impact member, the inner end of each spring being bent to form an elongated eye through which one of said bolts is extended, two spaced vertical spring bars attached at their lower ends to said horizontally extending impact member, the free ends of said spring bars being connected, a semi-elliptic spring fixed at its upper end to said spring bars, a bolt attached to said spring bars adjacent their lower ends, the lower end of said last-mentioned semi-elliptic spring being bent to form an elongated eye through which the bolt carried by said spring bars is extended, and braces attached to the central portion of said last-mentioned semi-elliptic spring, said braces being adapted to be secured to the vehicle frame.

3. An automobile bumper according to claim 1, comprising two spaced vertical spring bars attached at their lower ends to the upper one of said impact bars, the free ends of said spring bars being curved and attached to one another, a semi-elliptic spring fixed at its upper end to said spring bars, a bolt attached to said spring bars adjacent their lower ends, the lower end of the last-mentioned semi-elliptic spring being bent to form an elongated eye through which the bolt carried by said spring bars is extended, and braces attached to the central portion of said last-mentioned semi-elliptic spring, said braces being adapted to be secured to the vehicle frame.

Signed at New York, in the county of New York, and State of New York, this 18th day of Sept. A. D. 1924.

VLADIMIR BREUER.
PHILIP LESCHNIK.